United States Patent [19]

Furman

[11] Patent Number: 5,227,677
[45] Date of Patent: Jul. 13, 1993

[54] ZERO POWER TRANSMISSION LINE TERMINATOR

[75] Inventor: Anatol Furman, Jericho, Vt.

[73] Assignee: International Business Machines Corporation, Armonk, N.Y.

[21] Appl. No.: 896,719

[22] Filed: Jun. 10, 1992

[51] Int. Cl.$^5$ ............................................. H03K 19/003
[52] U.S. Cl. ................................. 307/443; 307/475; 307/560; 307/272.2
[58] Field of Search ............... 307/443, 451, 475, 550, 307/554, 560, 272.2

[56] References Cited

U.S. PATENT DOCUMENTS

| | | | |
|---|---|---|---|
| 4,015,147 | 3/1977 | Davidson et al. | 307/270 X |
| 4,345,171 | 8/1982 | Harris, Jr. | 307/560 |
| 4,985,674 | 1/1991 | Woods et al. | 307/475 X |
| 5,023,488 | 6/1991 | Gunning | 307/443 X |
| 5,029,284 | 7/1991 | Feldbaumer et al. | 307/443 |
| 5,111,080 | 5/1992 | Mizukami et al. | 307/475 |

Primary Examiner—David R. Hudspeth
Attorney, Agent, or Firm—J. Dennis Moore

[57] ABSTRACT

A terminator for a transmission line that consumes substantially zero power. According to a preferred embodiment, a four device latch is provided, coupled at one side of the latch to the transmission line by way of a resistance. The size of the devices on the side of the latch connected to the transmission line and the value of the resistance are selected such that the combined impedance of the resistance and the device impedance to ground is substantially the same as the characteristic impedance of the transmission line. A proper impedance termination is provided for steady state high and steady state low conditions, as well as during substantially all of a transition there between.

7 Claims, 2 Drawing Sheets

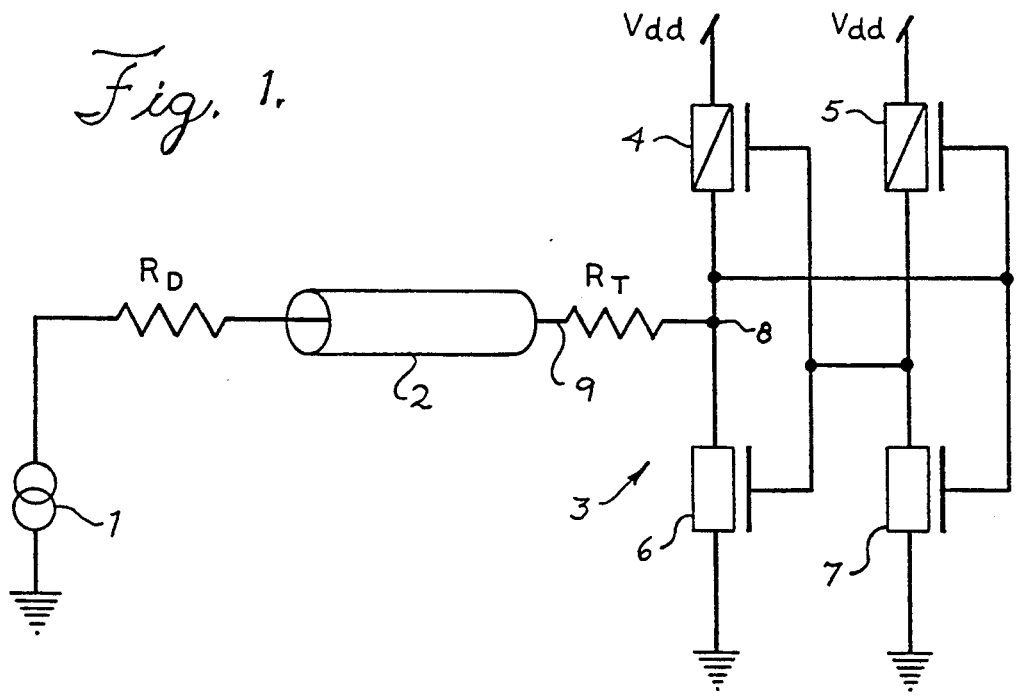
Fig. 1.
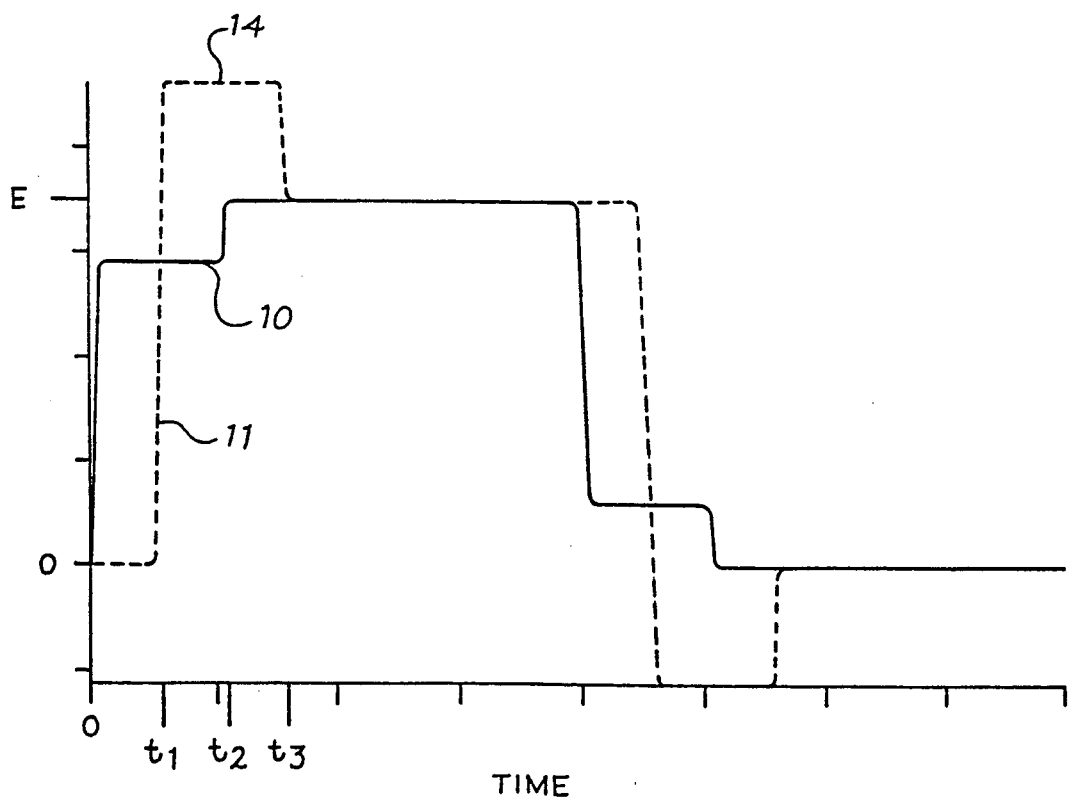

ZERO POWER TRANSMISSION LINE TERMINATOR

BACKGROUND OF THE INVENTION

1. Field of the Invention

The present invention relates to transmission line terminators that present the proper termination impedance to the transmission line, and more particularly relates to active circuit terminators wherein low power consumption is desired.

2. Background Art

As digital electronic circuits have become faster and faster, it has become recognized that the wires on memory, processor and other electronic cards behave like long transmission lines, where "long" is relative to the rise/fall transitions of pulses or waves incident on the transmission line. Such transmission lines commonly drive several receiver circuits distributed along the line, comprised entirely of MOSFETs and presenting a negligible capacitive load, and are open circuited at the far end. The open circuit at the far end results in reflections on the line that interfere with the operation of the receivers distributed along the line. (In this document, "near end" and "far end" of a transmission line refer to the end of the transmission line connected to a signal source and to the most distant point from the source, respectively.)

To minimize the effect of reflections, it has been common practice to limit the rise times of the line drivers, and to simply wait out the gradual damping of the reflections. This results in unacceptably long delays, undesirably lengthening the operating cycle times. Center tapped resistors between the plus voltage rail and ground, having a Thevenin equivalent impedance equal to that of the line can be used as a terminator to eliminate the reflections, but the resulting power dissipation penalty that this imposes on the driver chips has been considered unacceptable.

There have been several attempts to use active circuits to improve the termination characteristics without incurring a power penalty. These approaches have generally fallen into three categories.

The first type of approach involves the use of a pair of forward biased diodes connected between the plus rail and ground, using the center tap as an approximation for the line impedance, Z0. The diodes may be made as FET transistors, with the gates connected to their drains. Examples of this approach can be found in IBM Technical Disclosure Bulletin ("TDB"), Vol. 32, No. 4A, Sep. 1989, pp. 393-395 entitled "Active Terminators for CMOS Drivers," and in IBM TDB, Vol. 20, No. 12, May 1978, pp. 5192-5193, entitled "Low Power Dissipation Push-Pull Driver".

This approach represents a tradeoff between two undesirable conditions. Since the diodes are always forward biased, there is always standing power. To more nearly approximate Z0, and thereby reduce the magnitude of the reflections, requires more power. On the other hand, reducing the power degrades the impedance match between the terminator and the line, thus increasing the magnitude of the reflections.

The second type of approach involves the use of a level sensitive receiver to sense the transition of the incident wave at the far end of the transmission line, and to develop turn-on signals which can turn on transistor switches between the appropriate power rail and the transmission line. The switches may use their dynamic channel impedance, or they may switch in resistors whose values can be chosen to terminate the transmission line. This catagory can be further subdivided into two subcatagories. The first involves steady state termination. Examples of this can be found in U.S. Pat. No. 4,859,877, which issued on Aug. 22, 1989 to Cooperman, et al., entitled "Bidirectional Digital Signal Transmission System," and in IBM TDB Vol. 28, No. 10, Mar. 1986, pp. 4268-4269, entitled "Active Terminator for Transmission Line". The second subcatagory involves transient termination only. An example of that can be found in IBM TDB Vol. 30, No. 7, Dec., 1987, pp. 393-395, entitled "Transient Terminator for Transmission Lines."

The approaches presented in these subcatagories, both have limitations. Both use a level sensitive detector to determine when to switch the terminating impedance across the line. Thus, the termination is applied some delay after the input transition crosses some design threshold. In Cooperman there may be six stages of delay before the decision is made to change the terminating polarity. In the IBM TDB Vol. 28, No. 10, article there are two stages of delay. As a result of this delay, the change of terminating polarity happens late, resulting in additional reflections. Both of these references claim to achieve zero steady state power, but the time to reach steady state during transitions is greater than desired. The Cooperman patent also implies clocking the time in which the determination is active.

The IBM TDB Vol. 30, No. 7, article also suffers from the delay in detecting the time at which the incident wave crosses a threshold. In addition, it uses the channel impedance of two transistors to approximate Z0, but the two transistors are conducting only for a transient period determined by a delay line. As a consequence, the termination circuit serves only to limit the duration of over-shoot.

The third type of approach uses capacitive coupling for transient cut-off. An example of this type can be found in IBM TDB, Vol. 19, No. 10, Mar. 1977, p. 3745, entitled "Dynamic Active Terminator Circuit." According to this approach, a capacitor couples current to the base of a bipolar transistor during a positive-going transition, which drives the transistor for a period of time determined by the capacitor and an associated resistor, placing into the circuit for such period of time a termination resistor. This approach suffers from the lag effect of the capacitive coupling and only operates on positive-going transitions.

Numerous disclosures can be found in the prior art of various types of circuits that are intended for placement at the receiving end of logic circuits, but which do not address the problem of providing proper termination impedance to a transmission line. For example, IBM TDB Vol. 32, No. 10B, Mar. 1990, pp. 272-273, entitled "Tri-State Driver with Integrated Hold Circuit," discloses as prior art the use of a latch in connection with tri-state drivers. The latch is intended to hold receiver input levels in the high impedance state of the tri-state driver at a "0" or "1" level, preventing the receiver input from drifting to an arbitrary level. The reference recommends placing the latch closely proximate the tri-state driver to perform its voltage hold function, rather than with a receiver, citing the hysteresis delay effect of the latch as being beneficially removed by the elimination of the latch at the receiver. This reference teaches nothing of transmission line termination or impedance matching.

Another type of circuit is the flow-through, or fall-through, latch, such as that disclosed in IBM TDB, Vol. 32, No. 12, May 1990, pp. 389-392, entitled "On-Chip Receiver Featuring Fall-Through Radiation-Hardened Latching." This reference points out that latches have been used in connection with VLSI chip inputs, particularly in memory applications, to aid in interleaving in system environments. The reference goes on to propose a technique for radiation-hardening such latches to prevent unwanted latch switching from incident radiation by provision of resistance internal to the latch to integrate out the short electrical pulses that can be generated by such radiation, so as to prevent such unwanted switching. The reference teaches nothing of transmission line termination or impedance matching.

A still further type of circuit is the undershoot/overshoot clamp or damper. Examples of this can be found in the following U.S. Pat. No. 5,103,118, which issued on Apr. 7, 1992, to C.M. Peterson, entitled "High Speed Anti-Undershoot and Anti-Overshoot Circuit," U.S. Pat. No. 4,970,419 which issued on Nov. 13, 1990, to T. P. Hagen, et al., entitled "Low-Noise Transmission Line Termination Circuitry," U.S. Pat. No. 4,943,739, which issued on Jul. 24, 1990, to G.G. Slaughter, entitled "Non-Reflecting Transmiqsimn Line Termination," and U.S. Pat. No. 4,015,147, which issued on Mar. 29, 1977, to E.E. Davidson, et al., entitled "Low Power Transmission Line Terminator".

Accordingly, it is an object of the invention to provide a transmission line terminator that dissipates substantially zero steady state power.

It is a further object of the invention to provide such a terminator that presents a very good impedance match with the transmission line so as to minimize reflections on the transmission lines.

It is a still further object of the invention to provide such a terminator for a transmission line comprised of a minimal number of circuit devices so as to provide an efficient implementation.

These and other objects and features are achieved by the present invention as will now be described.

SUMMARY OF THE INVENTION

In accordance with the principals of the present invention, an active circuit transmission line terminator is provided that draws a relatively small amount of DC current from a power source. The terminator includes an input port available for connection to a transmission line having a characteristic impedance. The terminator also includes a latch circuit, including a first and a second transistor of a first type, and a first and a second transistor of a second, complementary type, interconnected and connected between the power source and ground in a latch configuration, having a latch port coupled to the input port. Further, the terminator also includes means for causing the latch circuit to switch states in response to a signal applied to the input port at an input port voltage substantially greater than half of the voltage difference from the input port voltage value of a latched state to the input port voltage in the opposite latched state, i.e., means for providing hysteresis. The characteristics of the transistors and of the foregoing means are selected such that the resultant impedance to AC ground seen at the input port is substantially the same as the characteristic impedance of the transmission line, such that the energy incident on the transmission line is terminated with an impedance that is substantially the same as the characteristic impedance of the transmission line.

In accordance with a first embodiment of the invention, the first and second type transistors are n-type and p-type metal oxide semiconductor field effect transistors (MOSFETs), and the means for providing hysteresis is a resistor connected between the latch port and the input port. This embodiment can draw extremely low steady state current, being measured in picoamps. However, the invention is not limited to applications in MOSFET technologies, and could even be implemented in bipolar technology, for example, although it will be understood that steady state current dissipation in such alternate embodiments will, in general, be higher than those in MOSFET technologies.

In accordance with the forgoing, the transmission line terminator of the present invention senses the power dissipation due to the collapsing electro-magnetic field in order to change the terminating polarity, and as such, automatically causes such change to occur at the optimal time. Furthermore, only four devices and a resistor are required.

BRIEF DESCRIPTION OF THE DRAWINGS

FIG. 1 is a circuit diagram showing a first preferred embodiment of the present invention connected to a transmission line driven by a voltage source.

FIG. 2 is a graph showing voltage waveforms at the near and far end of the transmission line of FIG. 1.

DETAILED DESCRIPTION OF THE PREFERRED EMBODIMENT

Figure 3:
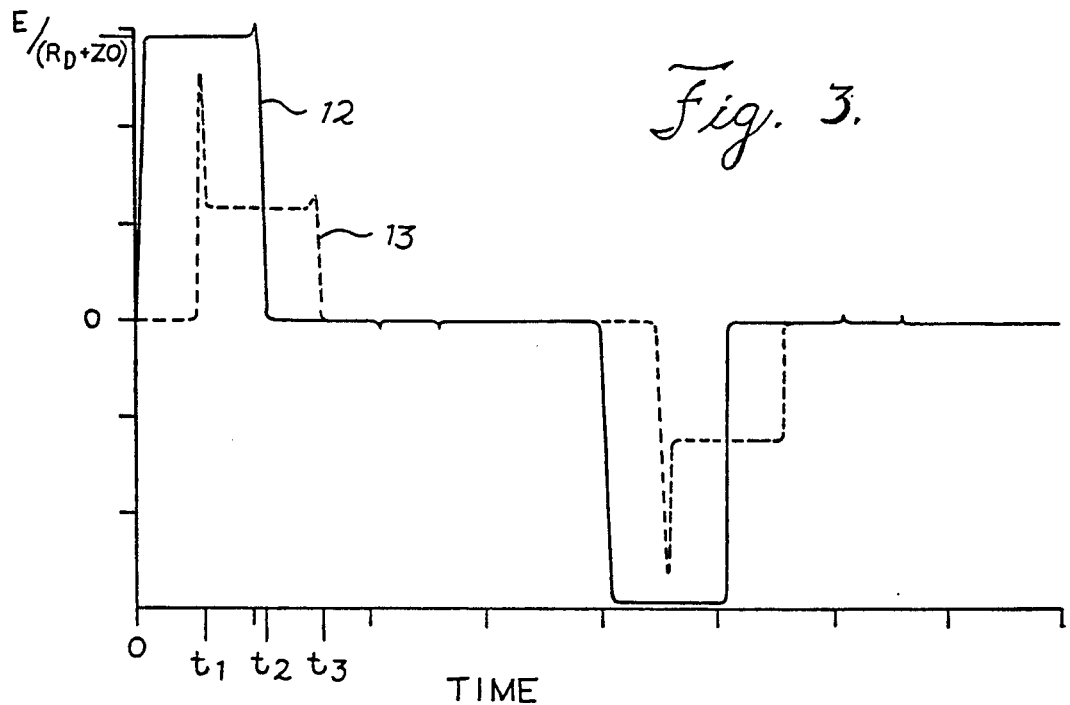
FIG. 3 is a graph showing current waveforms at the near and far end of the transmission line of FIG. 1.

FIG. 1 shows a network including a voltage driver 1 and its Thevenin equivalent resistance $R_D$ attached to the near end of and driving a transmission line 2 having a characteristic impedance Z0 and terminated at its far end by a circuit 3, which is a first preferred embodiment of the present invention. Circuit 3 comprises P-type FET device 4 and 5, and N-type FET devices 6 and 7, interconnected to form a latch coupled to the end of transmission line 2 by resistance $R_T$ as shown. $V_{dd}$ is the supply voltage for the circuit. Such a circuit is typically incorporated on an intergrated circuit. As such, the input resistor $R_T$ can be conveniently constructed of properly sized complimentary transistors biased in their conducting state, a known technique.

Devices 4 and 6 are sized such that in the zero input state, the channel impedance of device 6 together with the resistance $R_T$ equals the characteristic impedance, Z0, of transmission line 2. In the "1" input state, the channel impedance of device 4 together with resistance $R_T$ equals the same Z0. The limiting case of $R_T = Z0$ is not allowed, as the device sizes would have to be infinite.

The purpose of resistor $R_T$ is to provide a hysteresis effect such that the latch port 8 lags the input port 9 for most of the input transition. In other words, the latch port is the tap point of a voltage divider between the input port and AC ground. This assures that the transition is well past its midpoint at input port 9 before the latch starts to switch. This avoids undesirable conditions that can otherwise occur, such as oscillations of the latch/transmission line system, and ringing on the line. Wherefore, the limiting case of $R_T=0$ is not considered desirable, as it provides no hysterisis effect. A convenient value for $R_T$ is one-half of Z0. However, selection of the value of $R_T$ is a matter of design choice, once the principles of the present invention, as described herein, are understood. In addition, although it is preferred that the resistor $R_T$ be of fixed value, it can be made adjustable to compensate for any variation in characteristic impedance of the transmission line to which it may be attached.

It will be noted that the hysteresis effect just described is a voltage domain hysteresis. However, time domain hysteresis can be effective as well. Thus, the provision of a capacitor in conjunction with the switching devices 5 and 7 to delay the switching of the latch can prevent undesirable conditions also. Other means of providing hysteresis can be conceived, and the provision of all such alternatives with the other elements of the invention is considered to be within the scope of the present invention.

Returning to the description of the embodiment of FIG. 1, the sizes of devices 5 and 7 are chosen such that the switching time of the latch is less than the rise/fall time of the input transition from the transmission line 2.

While not shown in FIG. 1, it is understood that, as described in the background, above, various multiple circuits such as receivers are typically connected to various points along the transmission line 2.

In any steady state, the latch portion of circuit 3 holds the previously terminated line state, and presents Z0 impedance to transmission line 2. As a new incident wave presents itself to circuit 3, the voltage and the current build up in circuit 3 in approximately the same ratio (i.e., Z0) as the voltage and current in the transmission line. As the incident wave nears its maximum value, the latch switches in response to the power dissipated internal to circuit 3 as a result of the collapse of the electro-magnetic field in line 2.

FIG. 2 is a graph of voltage versus time showing the response to a wave incident on transmission line 2 of FIG. 1. Solid line 10 shows the voltage response at the near end of line 2, while dashed line 11 shows the voltage response at the far end of line 2. FIG. 3 is a graph of current versus time showing the current response for the incident wave at the near and far ends of line 2, solid line 12 being the response at the near end and dashed line 13 being the response at the far end of line 2. It is assumed that any loading on the line is capacitive.

The voltage transition, shown in FIG. 2, is initially attenuated before entering the line 2 by the voltage divider effect of $Z0/(R_D+Z0)$. That pulse flows to circuit 3 (FIG. 1) at the far end of transmission line 2 arriving at time $t_1$, and is substantially terminated in the device and resistor impedance of circuit 3. However, in the process, the latch of circuit 3 changes state, and this change of state launches a new wave back towards the source 1, resulting in a controlled overshoot 14 at the input of circuit 3.

When this overshoot wave reaches the source driver 1 (FIG. 1) at time $t_2$ it sees a poor termination, and returns an inverted reflection traveling back towards circuit 3. Since circuit 3 has already switched, when this inverted return reflection reaches circuit 3 at time $t_3$, it cancels the overshoot (FIG. 2). In other words, at time $t_3$ the summation of three waves at the input of circuit 3, namely, the original incident wave, the overshoot caused by and at the input to circuit 3, and the inverted return reflection from the near end, all sum to the proper boundary condition at the input to circuit 3, where the line is charged to the voltage value E, as shown in FIG. 2, and the line current is returned to 0 at time $t_3$, as shown in FIG. 3. Thus, the incident wave energy is totally absorbed after three line transits of the incident wave. In other words, the far end of the line becomes quiescent after three line transits of the incident wave. At that point in time, the line is charged to the new value of voltage E, the current has collapsed to 0, and circuit 3 holds the new value of the line potential.

The action of circuit 3 automatically guarantees that the overshoot launch value at latch switching will, when it arrives at the source 1, cause the source end of transmission line 2 to step up to voltage E, independent of the value of $R_D$. In other words, the summation of three waves at the source end of line 2, the original incident wave, the overshoot launch arriving at the source, and the inverted return reflection as a result of the overshoot wave, all sum to the proper boundary condition at the near end, such that the line is charged to E and the source current is 0. In other words, the near end of the line becomes quiescent after two line transits of the incident wave.

From FIG. 2, it can be seen that the voltage of the incident wave at the near end of line 2 steps up to E after two line transits. At the far end of line 2, the voltage overshoots after one line transit, remains at this level for two line transits, and then steps down to E. Total energy absorption occurs after three line transits, since no energy shows up at the far end two transits after $t_3$.

From the current response of FIG. 3 it is seen that the incident current at the near end steps up to $E/(R_d+Z0)$, remains there for two line transits, and steps down to 0. No later reflections arrive at the near end, and therefore the near end of the line is quiescent after two line transits.

It will be noted that in FIGS. 2 and 3 a negative going pulse is also shown appearing subsequent to the positive going pulse, which displays the inverse of the conditions described above.

Figure 4:
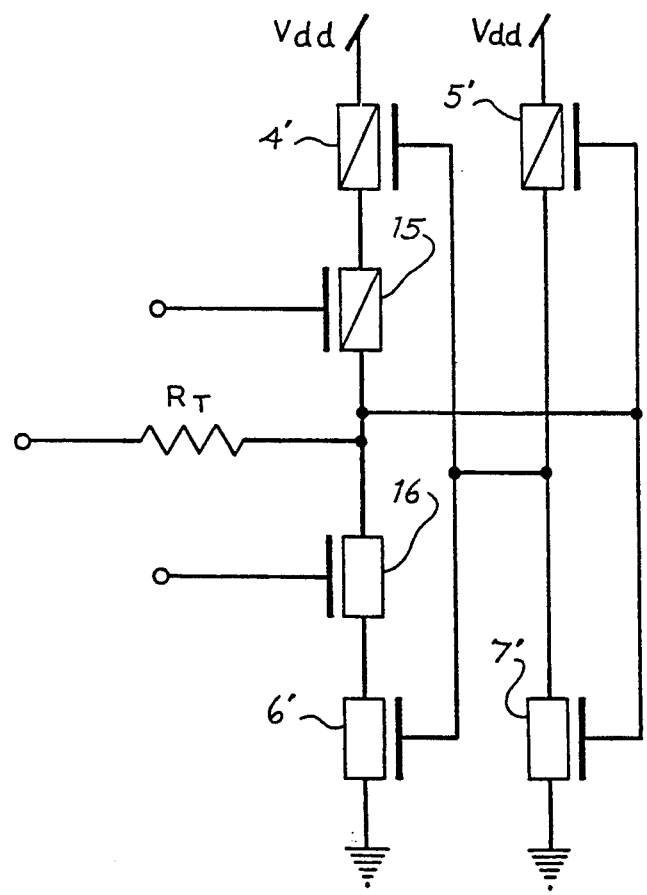
FIG. 4 is a circuit diagram of the active circuit portion of a second preferred embodiment of the present invention.

FIG. 4 is a circuit diagram showing a second preferred embodiment of the present invention. In addition to devices 4', 5' 6' and 7', corresponding to devices 4, 5, 6 and 7 of FIG. 1, a P type device 15 and N type device 16 are included as shown. These additional devices 15 and 16 may be switched on and off to provide the additional function of disabling the feedback to force the input impedance to open circuit. This embodiment is most useful in bidirectional applications, where the near end terminator is open circuited while the near end driver is in low impedance state. In this embodiment, the impedance values of additional devices 15 and 16 must be taken into account along with impedance of devices 4' and 6', and the resistance value of resistor value $R_T$, when selecting values to provide the proper termination impedance for line 2 (FIG. 1).

While the invention has been described with reference to its preferred embodiments, various modifications could be made to the teachings rendered above without departing from the spirit and scope of the invention. For example, other devices could be added to provide other modes of switching. Therefore, the full intended scope of the invention is to be determined solely with reference to the appended claims.

What is claimed is:

1. An active circuit transmission line terminator, comprising:
   an input port available for connection to an end of a transmission line having a characteristic impedance;
   a latch circuit, comprising a first and a second transistor of a first type, and a first and a second transistor of a second, complementary type, connected between a power source and ground in a latch configuration having a first and second latched states and a latch port coupled to said input port; and
   means for causing said latch circuit to switch between said first and second states in response to a signal applied to said input port at an input port voltage substantially greater than half of the difference from the input port voltage value of a latched state to the input port voltage value in the opposite latched state;
   said transistors and said means having selected impedance with respect to AC ground at said input port as to be substantially the same as the impedance of transmission line to which it may be connected.

2. A transmission line terminator according to claim 1:
   wherein said second transistor of said first type and said second transistor of said second type are coupled serially through a common point by way of their primary current carrying ports between said power source and ground, and have their control ports coupled to said latch port; and
   said first transistor of said first type and said first transistor of said second type being coupled serially through a common point by way of their primary current carrying ports between said power source and ground, the common point therebetween being connected to said latch port, and having their control ports coupled to said second transistors' common point.

3. The transmission line terminator of claim 2, further comprising:
   switch means interposed between said first transistors and said latch port to switchably connect to and disconnect from said latch port said first transistors;
   wherein the impedance of said first transistors and said switch means is substantially the same as the impedance of said line.

4. A transmission line terminator that draws substantially zero DC current, comprising:
   a latch circuit having a latch port, comprising a first and a second p-type field effect transistor (FET) and a first and a second n-type FET, connected between a power source and ground and to the latch port; and
   a resistor having a first end connected to said latch port, the second end being available for connection to an end of a transmission line;
   the impedances of said FETs and said resistor being selected to be substantially the same as the impedance of the line.

5. The terminator of claim 4, further comprising:
   switch means for switching the first FETs into and out of the terminator circuit;
   the impedances of said first FETs, said switch means and said resistor being selected such that the resultant impedance to AC ground of the terminator, when said first FETs are switched into the circuit, is substantially the same as the impedance of the transmission line.

6. A terminated transmission line system having substantially no DC current comprising:
   a transmission line having a characteristic impedance;
   a latch circuit, comprising a first and a second transistor of a first type and a first and a second transmission of a second, complementary type interconnected and connected between a power source and ground in a latch configuration having a latch port;
   a resistor having a first end connected to said latch port and a second end connected to a first end of said transmission line, the second end of said transmission line being available for connection to a signal source;
   wherein the characteristics of said transistors and the resistance value of said resistor are selected such that the resultant impedance to AC ground seen at the second end of said resistor is substantially the same as the characteristic impedance of said transmission line, such that the transmission line is terminated with an impedance that is substantially the same as the characteristic impedance of the transmission line.

7. The terminator of claim 4, wherein said resistor has an impedance greater than zero and less than the impedance of the line to which it is to be coupled.

* * * * *